United States Patent [19]

Kawai et al.

[11] E Patent Number: Re. 31,901

[45] Reissued Date of Patent: May 28, 1985

[54] CONTINUOUS ELECTROLYTICAL TREATMENT OF ALUMINUM OR ITS ALLOYS

[75] Inventors: Satoshi Kawai; Yoichi Yamagiwa, both of Chigasaki; Masashi Mizusawa, Fugisawa; Hiroshi Watanabe, Hiratsuka; Yoshio Ando; Masaaki Takahashi, both of Tokyo, all of Japan

[73] Assignees: Pilot Man-Nen-Hitsu Kabushiki Kaisha; Toyo Giken Kogyo Kabushiki Kaisha, both of Tokyo, Japan

[21] Appl. No.: 277,613

[22] Filed: Jun. 24, 1981

Related U.S. Patent Documents

Reissue of:

[64] Patent No.: 4,014,758
Issued: Mar. 29, 1977
Appl. No.: 570,376
Filed: Apr. 22, 1975

[30] Foreign Application Priority Data

Apr. 23, 1974 [JP] Japan ..... 49-46209

[51] Int. Cl.[3] ..... C25D 7/06

[52] U.S. Cl. ..... 204/28; 204/37.6; 204/58; 204/228; 204/DIG. 8; 204/DIG. 9

[58] Field of Search ... 204/28, 58, 228, DIG. 8–DIG. 9, 204/35 N

[56] References Cited

U.S. PATENT DOCUMENTS

| | | | |
|---|---|---|---|
| 2,111,377 | 3/1938 | Wales | 204/58 |
| 2,196,018 | 4/1940 | Korpiun | 204/58 |
| 2,685,563 | 8/1954 | Gauthier | 204/58 |
| 2,901,412 | 8/1959 | Mostovych et al. | 204/28 |
| 2,951,025 | 8/1960 | Mostovych et al. | 204/DIG. 9 |
| 3,079,308 | 2/1963 | Ramirez et al. | 204/28 |
| 3,359,190 | 12/1967 | Cooke et al. | 204/28 |
| 3,717,555 | 2/1973 | Chakravarti et al. | 204/58 |
| 3,726,783 | 4/1973 | Herrmann et al. | 204/28 |
| 3,787,295 | 1/1974 | Endinger et al. | 204/35 N |
| 3,849,263 | 11/1974 | Gedde | 204/58 |
| 3,878,056 | 4/1975 | Yanagida et al. | 204/58 |

FOREIGN PATENT DOCUMENTS

| | | | |
|---|---|---|---|
| 381715 | 3/1963 | Japan | 204/58 |

*Primary Examiner*—R. L. Andrews
*Attorney, Agent, or Firm*—Wenderoth, Lind & Ponack

[57] ABSTRACT

A process for electrolytically treating aluminum or its alloys in the form of a strip, wire or foil material in a continuous manner which comprises continuously passing the material through an anodic oxidation treatment cell through which a direct current, alternating current or AC-superimposed direct current is caused to flow and an electrolytic coloring cell through which an alternating current or AC-superimposed direct current is caused to flow and carrying out electrolysis in both said cells to anodize and color the material in a continuous manner.

10 Claims, 5 Drawing Figures

CONTINUOUS ELECTROLYTICAL TREATMENT OF ALUMINUM OR ITS ALLOYS

Matter enclosed in heavy brackets [ ] appears in the original patent but forms no part of this reissue specification; matter printed in italics indicates the additions made by reissue.

*This is a reissue application of U.S. Pat. No. 4,014,758, which matured from Ser. No. 570,376, filed Apr. 22, 1975.*

BACKGROUND OF THE INVENTION

The present invention relates to a process for electrolytically treating aluminum or its alloys in the form of a strip, wire or foil in a continuous manner to color the same.

Heretofore, in order to color aluminum or its alloys in the form of a strip, wire or foil material by an electrolytic treatment, the material accommodated in a receptacle such as a cage is first immersed in an anodizing cell and then in an electrolytic coloring cell by a batch process. However, this process is disadvantageous in that it is inefficient and produces deviations in the quality of products, whereby it is difficult to attain uniformity in quality. Further, in the case where the material to be treated has a thickness below 0.4 mm, it is bent by impact to which it is subjected when taken in and out from an electrolytic solution. For this reason, the thickness of the material to be treated must be greater than 0.4 mm.

Alternatively, there has been a process for coloring aluminum or its alloys in the form of a strip, wire or foil material wherein the material is electrolytically treated in a continuous manner to form an anodic oxide film thereon and then, the anodized material is colored by a non-electrolytic method such as the use of an organic dye and immersion in an inorganic salt solution. However, the colored product according to this process is poor in fastness to light, whereby it is unsuitable for use as an outer cover and the like.

SUMMARY OF THE INVENTION

It is an object of the present invention to overcome the aforementioned drawbacks and to provide a process for continuously anodizing and electro-coloring aluminum or its alloys in the form of a strip, wire or foil to obtain a colored product which is excellent in fastness to light. Thus, the present invention has the following distinctive features.

1. The process of the present invention is efficient and thereby reduces the production cost and affords the production of inexpensive products.
2. The thickness of the colored layer obtained according to the present process is uniform.
3. The present process makes possible treatment of a thin material below 0.3 mm in thickness.
4. It is possible to produce a product of long length.

DETAILED DESCRIPTION

In the anodic treatment of the present invention, the electric current used may be a direct current, an alternating current or an AC-superimposed direct current.

Particularly, an alternating current or an AC-superimposed direct current is used as the electric current in an electrocoloring treatment, and the use of these currents provides the following advantages as compared with the use of a direct current:

1. The thickness of an anodic oxide film has only a little effect on the electrolytic coloring, and electrolytic coloring is possible as long as the film has a thickness of at least 1$\mu$, which is suitable for a continuous electrolytic coloring process (In the case of a direct current, electrolytic coloring is impossible unless the film is above 5$\mu$ in thickness).

2. Colorability is excellent and coloring is easy, and the shade of color may be suitably controlled by varying voltage, the electric current, and the electrolysis time.

3. Throwing power is much higher, and a uniform coloring with no deviation of color can be attained.

4. Lower voltage can be used, which is economical (the present process uses a voltage of from 10 to 30 volt, while in the case of a direct current, a voltage of from 30 to 60 volt is required).

5. The varieties of colors obtainable are abundant. For example, a coloring solution containing a tin salt provides an olive, amber or black color depending on the coloring conditions such as electric current and duration time. A coloring solution containing a tin salt and a nickel, cobalt, iron, magnesium, or zinc salt provides a stainless, bronze, amber, olive, blue, grey, or black color depending on the anodizing conditions and coloring conditions. A coloring solution containing a tin salt and a copper salt provides a bronze, red, black brown or black color depending on the coloring conditions. A coloring solution containing a copper salt provides a pink, red, red purple or black color depending on the coloring conditions. A coloring solution containing a selenium salt provides a gold color. A coloring solution containing a manganese salt provides a grey or gold color depending on the coloring conditions. Also, a coloring solution containing a zirconium salt provides a white or grey color depending on the coloring conditions.

The term "AC-superposed direct current" used herein designates the wave shape of an electric current (or a voltage) which represents a periodic change of polarity and contains an alternating current component, In the process of the present invention, aluminum and most of its alloys may be used. However, materials having a purity in excess of about 99% are suitable for the process of the present invention.

The process of the present invention may be carried out by any of the examples indicated in FIGS. 1 through 5.

Figure 1:
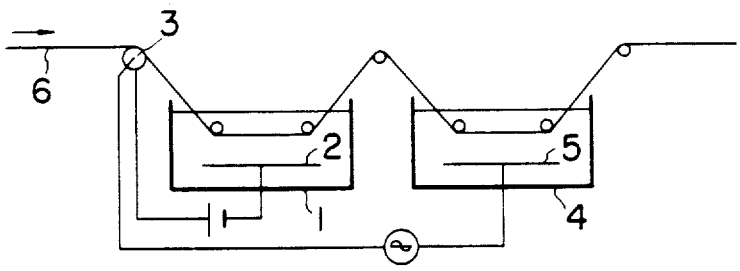
FIGS. 1 through 5 are schematic side views with parts in the form of electrical circuit diagrams respectively showing the essential organizations of examples of apparatus suitable for carrying out the process of the invention.

Referring to FIG. 1, in an example using an apparatus as shown therein, a direct-current voltage is applied between an electrode plate 2 disposed within an anodic oxidation treatment cell 1 and an electric power supply element 3 disposed outside the cell and an alternating current voltage is applied between an electrode plate 5 disposed within an electrolytic coloring cell 4 and the electricity supply element 3.

A strip, wire or foil 6 (hereinafter referred to as "strip") of aluminum or an alloy thereof wound on an uncoiler (not shown) is unwound and the strip is subjected to a pretreatment comprising degreasing, washing with water, etching, washing with water, neutralization, and washing with water. The strip thus pre-treated is contacted with the supply element 3 to charge it positively, and the charged strip is passed through the cell 1 at any appropriate rate to anodize it. The anodized strip is then passed through the cell 4 to color it. Thereafter, the colored strip is washed with water and wound up on a recoiler (not shown).

The following examples will further illustrate the first example as described above of the process of the present invention.

EXAMPLE 1

An aluminum alloy (5005-H14) was anodized at a rate of 4 m/min. in a sulfuric acid solution having a concentration of 300 g per liter in the electrolytic cell 1 including an electrode plate 2 made of lead. The temperature of the solution was 30° C., and the direct current voltage applied was 20 V. Then, the anodized alloy was electrolytically colored in the electrolytic cell 4 containing 2 g/l stannous sulfate, 20 g/l nickel sulfate, 10 g/l sulfuric acid, and 5 g/l cresol sulfonate and including an electrode plate 5 made of nickel. The temperature of the solution was 25° C., and the alternating current voltage was 15 V. The product having an anodic oxide film of a thickness of 4μ thus obtained had a bronze color.

EXAMPLE 2

An aluminum alloy (1100-H14) was anodized at a rate of 5 m/min. in an aqueous solution containing 35 g/l sulfuric acid and 3 g/l glycerol in the electrolytic cell 1 including an electrode plate 2 made of carbon. The temperature of the solution was 15° C., and the direct current voltage applies as 25 V. Then, the anodized alloy was electrolytically colored in the electrolytic cell 4 including an electrode plate 5 made of carbon, using an aqueous solution containing 20 g/l copper sulfate and 15 g/l sulfuric acid. The temperature of the solution was 20° C. and the alternating current voltage applied was 15 V. The product having an anodic oxide film of a thickness of 3μ thus obtained was red in color.

Alternatively, the anodized alloy was subjected to an electrolytic coloring treatment at the same rate in the same cell using an aqueous solution containing 5 g/l stannous sulfate, 10 g/l ferrous sulfate, 8 g/l hydrazine sulfate, 8 g/l tartaric acid and 10 g/l sulfuric acid. The temperature of the solution was 25° C., and the alternating current voltage applied was 18 V. The product having an anodic oxide film of the same thickness thus obtained was amber in color.

EXAMPLE 3

In this example, the coloring treatment procedure was repeated using the same anodizing and coloring conditions as in the preceding Examples except that an alternating current voltage of 10 to 50 V was applied to the electrode plate 2 instead of applying a direct current voltage. Similar results were obtained.

Figure 2:
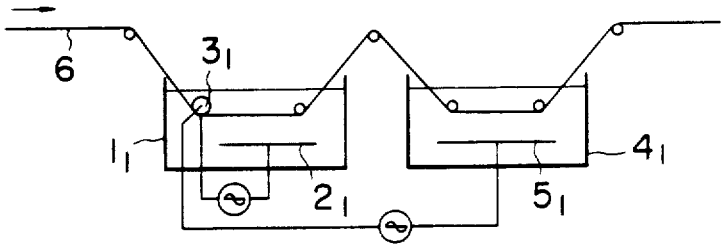

In another example of the process of the invention using an apparatus as shown in FIG. 2, an alternating current voltage is applied between an electrode plate $2_1$ and an electric power supply element $3_1$ which are disposed within an anodic oxidation treatment cell $1_1$ and between an electrode plate 5, and the electric power supply element $3_1$ which are disposed within an electrolytic coloring cell $4_1$.

A strip 6 would on an uncoiler (not shown) is unwound and is subjected to the same pretreatment as described above. The strip thus pretreated is contacted by the supply element $3_1$ to charge it positively, and the charged strip is passed through the cell $1_1$ at any appropriate rate to anodize it. The anodized strip is then passed through the cell $4_1$ to color it. Thereafter, the colored strip is washed with water and wound up on a recoiler (not shown).

EXAMPLE 4

In this example, the apparatus shown in FIG. 2 was used. An aluminum alloy (5052 - H32) was anodized at a rate of 4 m/min. in an aqueous solution containing 100 g/l oxalic acid in the electrolytic cell $1_1$ including an electrode plate $2_1$ made of aluminum. The temperature of the soluton was 40° C., and the alternating current voltage applied was 30 V. Then, the anodized alloy was electrolytically colored in the electrolytic cell $4_1$ including an electrode plate $5_1$ made of carbon using an aqueous solution containing 3 g/l stannous sulfate, 20 g/l cobalt sulfate, and 5 g/l cresol sulfonate. The temperature of the solution was 25° C., and the alternating current voltage applied was 30 V. When treating times of 30 seconds, 2 minutes and 8 minutes were used, the products having an anodic oxide film of a thickness of 4μ thus obtained were stainless, bronze and black in color, respectively.

Figure 3:
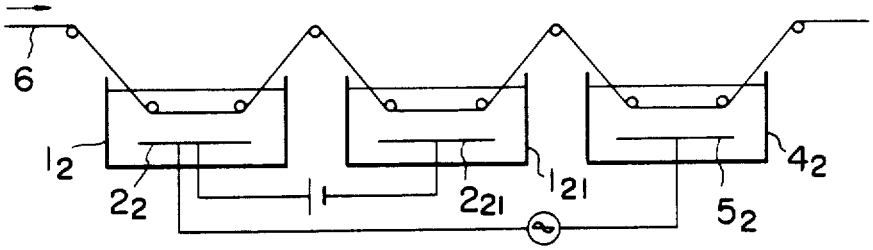

In an example using an apparatus as shown in FIG. 3, a direct current voltage is applied between an electrode plates $2_2$ and $2_{21}$, which are respectively disposed within [two anodic oxidation treatment cells $1_2$ and $2_{21}$] *a negatively charging cell $1_2$ and an anodic oxidation treatment cell $1_{21}$* (which contain an electrolytic solution having the same composition as that of the solution in the electrolytic cell 1), and an alternating current voltage is applied between the electrode plate $2_2$ and an electrode plate $5_2$ disposed within an electrolytic coloring cell $4_2$ (which contains an electrolytic solution having the same composition as that of the solution in the electrolytic cell 4).

A strip 6 wound on an uncoiler (not shown) is unwound and is subjected to the afore-mentioned pretreatment. The strip thus pretreated is passed through the [electrolytic] cell $1_2$ at any appropriate rate to charge it negatively and then passed through the [electrolytic] cell $1_{21}$ (both the [electrolytic] cells $1_2$ and $1_{12}$ containing an electrolytic solution having the same composition as that of the solution in the [electrolytic] cell 1) to anodize it under the same anodizing conditions as those in the [electrolytic] cell 1. Then, the anodized strip is subjected to an electrolytic treatment under the same coloring conditions as those in the electrolytic cell 4 while being passed through the electrolytic cell $4_2$. Results similar to those of the Examples using the apparatus shown in FIG. 1 are obtained. Thereafter, the colored strip is washed with water and wound up on a recoiler (now shown).

Figure 4:
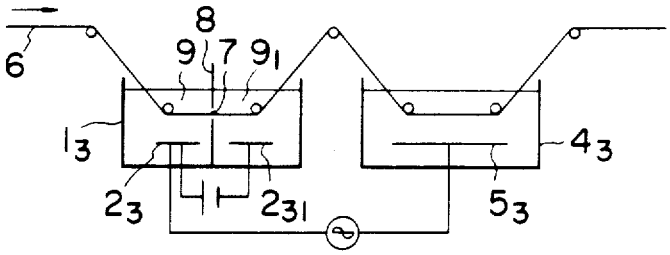

In still another example using the apparatus shown in FIG. 4, an anodic oxidation treatment cell $1_3$ (which contains an electrolytic solution having the same composition as that of the solution in the cell 1) is divided into two compartments [9 and $9_1$] *i.e. a negatively charging compartment 9 and an anodizing compartment $9_1$*, by means of a diaphragm 8 with a slit 7. A direct current voltage is applied between electrode plates $2_3$ and $2_{31}$ which are respectively disposed within the compartments 9 and $9_1$, and an alternating current voltage is applied between the electrode plate $2_3$ and an electrode plate $5_3$ disposed within an electrolytic coloring cell $4_3$ (which contains an electrolytic solution having the same composition as that of the solution in the cell 4).

A strip 6 wound on an uncoiler (not shown) is unwound and is then subjected to the pretreatment described in Example 1. The pretreated strip is passed through the compartment 9 in the [electrolytic] cell $1_3$ (the electrode plates $2_3$ and $2_{31}$ being made of aluminum) at any appropriate rate to charge it negatively and subsequently passed through the compartment $9_1$ to anodize it under the same anodizing conditions as those in the cell 1. The anodized strip is then passed through the electrolytic cell $4_3$ to color it under the same coloring conditions as those in the electrolytic cell 4. Results similar to those in Example 4 are obtained. The colored product is washed with water and wound up on a recoiler (not shown).

Figure 5:
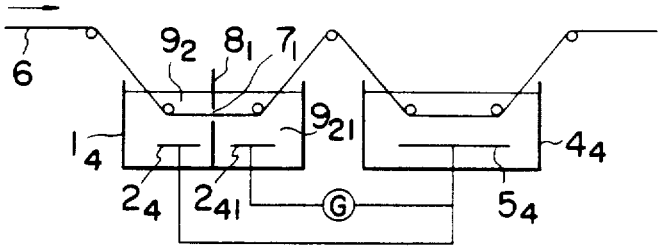

In a further example using the apparatus shown in FIG. 5, an anodic oxidation treatment cell $1_4$ is divided into two compartments [$9_2$ and $9_{21}$] *i.e. a negatively charging compartment $9_2$ and an anodizing compartment $9_{21}$*, by means of a diaphragm $8_1$ with a slit $7_1$. An AC-superimposed direct current from its sources G is applied between electrode plates $2_4$ and $2_{41}$ which are each disposed within the compartments $9_2$ and $9_{21}$ and between the electrode plate $2_4$ and an electrode plate $5_4$ disposed within an electrolytic coloring cell $4_4$.

A strip 6 wound on an uncoiler (not shown) is unwound and is subjected to the pretreatment as described in Example 1. The pretreated strip is passed through the compartment $9_2$ in the [electrolytic] cell $1_4$ at any appropriate rate to charge it negatively and subsequently passed through the compartment $9_{21}$ to anodize it. The anodized strip is then passed through the electrolytic cell $4_4$ to color it. The colored strip is washed with water and wound up on a recoiler (not shown).

EXAMPLE 5

In this example the apparatus shown in FIG. 5 was used. An aluminum alloy (1050 - H24) was anodized at a rate of 3 m/min. in an aqueous solution containing 100 g/l oxalic acid in the [electrolytic] cell $1_4$ including the electrode plates $2_4$ and $2_{41}$ made of aluminum. The temperature of the solution was 30° C. and the superposed current voltage applied was composed of an alternative current voltage of 20 V and a direct current voltage of 5 V. The anodized alloy was electrolytically colored in the electrolytic cell $4_4$ including an electrode plate $5_4$ made of carbon using an aqueous solution containing 5 g/l stannous sulfate, 10 g/l sulfuric acid, and 5 g/l phenolsulfonic acid. The alternating current voltage used was 25 V. When treating times of 1, 1½ and 3 minutes were used, a product having an anodic oxide film of a thickness of 5μ obtained was olive, amber and bronze in color, respectively.

Each colored strip was then washed with water and wound up on a recoiler with or without a sealing treatment depending on the end use.

Before winding up by a recoiler, the strip product may be coated with a thermosetting resin by means of various coating methods such as dipping, electrodeposition, blowing, electrostatic coating, power coating and roll coater coating and dried and baked to give a colored aluminum material having an excellent corrosion resistance and weather resistance. As a paint, a powder paint drying at normal temperature may be used.

The aluminum material produced according to the process of the present invention is processed into building materials such as a lengthy spandrel, panel and ceiling material for use in an outer or inner covering of a building, shop or house. The aluminum material may be laminated with a refractory board, iron plate or veneer plate to produce a composite material usable as a quality wall material. Further, the aluminum material may be used as a name plate and a decorative cover of electrical instruments.

We claim:

[1. A process for electrolytically treating aluminum or its alloy in the form of a strip, wire or foil material in a continuous manner which comprises continuously passing the material through an anodic oxidation treatment cell and an electrolytic coloring cell to carry out electrolysis in said cells to anodize and color the material in a continuous manner, characterized in that just prior to the anodizing stage, a circuit is formed by commonly connecting to the aluminum material a power source for anodizing and a power source for electrolytically coloring, said power source for anodizing being further connected to the anodizing cell and said power source for electrolytically coloring being further connected to the electrolytic coloring cell; said power source for anodizing being DC and the power source for electrolytically coloring being AC, or the power source for both of them being a single AC-superimposed direct current, whereby a current having an alternating wave form rich in positive component is supplied to the electrode of the electrolytic coloring cell.]

[2. The process according to claim 1 wherein the electrolytic coloring is carried out in a solution containing a tin salt.]

[3. The process according to claim 1 wherein the electrolytic coloring is effected in a solution containing a tin salt and at least one member selected from the group consisting of nickel salts, cobalt salts, iron salts, magnesium salts, and zinc salts.]

[4. The process according to claim 1 wherein the electrolytic coloring is carried out in a solution containing at least one member selected from the group consisting of copper salts, selenium salts, manganese salts, and zirconium salts.]

[5. The process according to claim 1 wherein a direct current voltage is applied between an electric power supply element outside the anodic oxidation treatment cell and an electrode plate within said cell and an alternating current voltage is applied between said element and an electrode plate within the electrolytic coloring cell.]

[6. The process according to claim 1 wherein two anodic oxidation treatment cells are used, a direct current voltage being applied between electrode plates contained respectively in said two cells, an alternating current voltage being applied between one of said plates and an electrode plate in the electrolytic coloring cell.]

[7. The process according to claim 1 wherein the anodic oxidation treatment cell is divided into two compartments by a diaphragm with a slit, a direct current voltage being applied between electrode plates contained in said compartments, an alternating current voltage being applied between one of said plates and an electrode plate in the coloring cell.]

[8. The process according to claim 1 wherein the anodic oxidation treatment cell is divided into two compartments by a diaphragm with a slit, an AC-superimposed direct current voltage being applied between electrode plates respectively in said compartments and an electrode plate in the coloring cell.]

[9. A process according to claim 1, wherein the aluminum material is charged with a current having an alternating wave form rich in cathodic component in the electrolytic coloring cell.]

*10. A process for electrolytically treating aluminum or its alloy in the form of a strip, wire or foil material in a continuous manner which comprises continuously passing the material first through a negatively charging cell, then through an anodic oxidation treatment cell and finally through an electrolytic coloring cell, each cell containing therein an electrolytic solution and comprising an electrode immersed in the electrolytic solution; wherein a circuit is formed by commonly connecting to the electrode in the negatively charging cell a power source for anodizing and a power source for electrolytically coloring, said power source for anodizing being further connected to the electrode in the anodic oxidation treatment cell and said power source for electrolytically coloring being further connected to the electrode of the electrolytic coloring cell, said power source for anodizing being DC and the power source for electrolytically coloring being AC, or the power source for both of them being a single AC-superimposed DC, whereby a current having an alternative wave form rich in positive component is supplied to the electrode of the electrolytic coloring cell, and the aluminum material is negatively charged through the electrolytic solution in the negatively charging cell, anodized in the anodic oxidation treatment cell and colored in the electrolytic coloring cell.*

*11. The process according to claim 10, wherein the electrolytic solution in the electrolytic coloring cell contains a tin salt.*

*12. The process according to claim 10, wherein the electrolytic solution in the electrolytic coloring cell contains a tin salt and at least one member selected from the group consisting of nickel salts, cobalt salts, iron salts, magnesium salts, and zinc salts.*

*13. The process according to claim 10, wherein the electrolytic solution in the electrolytic coloring cell contains at least one member selected from the group consisting of copper salts, selenium salts, manganese salts and zirconium salts.*

*14. The process according to claim 10, wherein the aluminum material is charged with a current having an alternative wave form rich in cathodic component in the electrolytic coloring cell.*

*15. A process for electrolytically treating aluminum or its alloy in the form of a strip, wire or foil material in a continuous manner which comprises continuously passing the material through an anodic oxidation treatment cell comprising a negatively charging compartment and an anodizing compartment separated from each other by a diaphragm with a slit for passing the aluminum material and then through an electrolytic coloring cell, each of said negatively charging compartment, anodizing compartment and electrolytic coloring cell containing an electrolytic solution and comprising an electrode immersed in the electrolytic solution; wherein a circuit is formed by commonly connecting to the electrode in the negatively charging compartment a power source for anodizing and a power source for electrolytically coloring, said power source for anodizing being further connected to the electrode in the anodizing compartment, said power source for electrolytically coloring being further connected to the electrode in the electrolytic coloring cell, said power source for anodizing being DC and the power source for electrolytically coloring being AC, or the power source for both of them being a single AC-superimposed DC, whereby a current having an alternative wave form rich in positive component is supplied to the electrode of the electrolytic coloring cell, and the aluminim material is negatively charged through the electrolytic solution in the negatively charging compartment, anodized in the anodizing compartment and colored in the electrolytic coloring cell.*

*16. The process according to claim 15, wherein the electrolytic solution in the electrolytic coloring cell contains a tin salt.*

*17. The process according to claim 15, wherein the electrolytic solution in the electrolytic coloring cell contains a tin salt and at least one member selected from the group consisting of nickel salts, cobalt salts, iron salts, magnesium salts, and zinc salts.*

*18. The process according to claim 15, wherein the electrolytic solution in the electrolytic coloring cell contains at least one member selected from the group consisting of copper salts, selenium salts, manganese salts and zirconium salts.*

*19. The process according to claim 15, wherein the aluminum material is charged with a current having an alternative wave form rich in cathodic component in the electrolytic coloring cell.*

* * * * *